(12) United States Patent
Bachan

(10) Patent No.: US 6,840,753 B2
(45) Date of Patent: Jan. 11, 2005

(54) STACK MOLD SUPPORT FOR AN INJECTION MOLDING SYSTEM

(76) Inventor: Douglas J Bachan, 5258 Breeze Hill Pl., Troy, MI (US) 48098

( * ) Notice: Subject to any disclaimer, the term of this patent is extended or adjusted under 35 U.S.C. 154(b) by 91 days.

(21) Appl. No.: 10/292,034

(22) Filed: Nov. 12, 2002

(65) Prior Publication Data

US 2004/0091571 A1 May 13, 2004

(51) Int. Cl.$^7$ ................................................ B29C 45/64
(52) U.S. Cl. ........................................ 425/186; 425/588
(58) Field of Search ................................ 425/186, 588, 425/589, 338

(56) References Cited

U.S. PATENT DOCUMENTS

| | | | |
|---|---|---|---|
| 3,465,387 A | | 9/1969 | Allard et al. |
| 4,604,258 A | | 8/1986 | Valyi |
| 5,012,568 A | * | 5/1991 | DiSimone et al. .......... 425/589 |
| 5,017,120 A | | 5/1991 | Holzinger et al. |
| 5,207,963 A | * | 5/1993 | Grace .......................... 425/186 |
| 5,336,462 A | | 8/1994 | Wohlrab |
| 5,362,434 A | * | 11/1994 | Hauser et al. ............... 425/186 |
| 5,382,158 A | | 1/1995 | Herbst |
| 5,445,508 A | * | 8/1995 | Kubo et al. .................. 425/186 |
| 5,542,838 A | * | 8/1996 | Wilhelm et al. ............. 425/186 |
| 6,261,085 B1 | | 7/2001 | Steger et al. |
| 6,503,075 B1 | * | 1/2003 | Schad et al. ................. 425/588 |

* cited by examiner

Primary Examiner—James P. Mackey
(74) Attorney, Agent, or Firm—Harness, Dickey & Pierce, P.L.C.

(57) ABSTRACT

A stack mold support has a clamping assembly fixed to a support frame. The clamping assembly has a plurality of clamps fixed to a first member and a plurality of clamps fixed to a second member. The plurality of clamps are slideable along the first and second members to releasably engage a stack mold. The stack mold support is disposed adjacent the stack mold in order to support the stack mold from above or below the stack mold within an injection molding press. When supported from above, the stack mold hangs from the stack mold support within the injection molding press.

21 Claims, 6 Drawing Sheets understood # STACK MOLD SUPPORT FOR AN INJECTION MOLDING SYSTEM

FIELD OF THE INVENTION

The present invention relates to an injection molding system and more particularly to a stack mold support for an injection molding press.

BACKGROUND OF THE INVENTION

Injection molding machines have been known in the art for some time. Typical injection molding machines are disclosed in U.S. Pat. No. 3,465,387 to Allard et al. and in U.S. Pat. No. 5,382,158 to Herbst, the specifications and drawings of which are herein expressly incorporated by reference. A standard molding press has a base, a fixed mold plate secured to the base, a fixed mold half carried on the fixed mold plate, and a movable mold plate displaceable on the base longitudinally forward away from the fixed mold half and backward toward the fixed mold half. A movable mold half is carried on the movable plate and fittable with the fixed mold half. Typically, a plurality of piston cylinders are mounted on the fixed plate with their piston rods projecting through the fixed plate and secured to the movable mold plate. Pressurization of these piston cylinders holds the mold tightly closed as molding material is injected into the closed mold and the material cures.

To increase the capacity of these conventional injection molding machines, stack mold assemblies have been developed. A typical stack mold assembly is disclosed in U.S. Pat. No. 4,604,258 to Valyi, the specifications and drawings of which are herein expressly incorporated by reference. A conventional stack mold uses at least two injection molds back-to-back, each having a mold cavity. The location of the cavities on opposing faces of the stack molds enables the same clamping and injection forces to be applied to the plurality of cavities at the same time, thereby increasing the output of the injection molding machine.

As the needs of industry grow, molded parts fashioned in the above manner have increased in size, thereby requiring larger and heavier stack molds. As these stack molds increase in size and weight, it becomes increasingly difficult to support them within the injection molding machine. Therefore, it is an object of the present invention to provide a stack mold support that enables lateral movement of the stack mold during clamping while simultaneously supporting the stack mold within the injection molding machine.

SUMMARY OF THE INVENTION

An injection molding system has an injection molding press with a first end connected by a plurality of lateral tie-bars to a second end. The first end has a first platen disposed between the plurality of tie-bars facing the second end. The second end has a second platen disposed between the plurality of tie-bars facing the first end. A stack mold assembly is disposed between the first platen and the second platen and has a plurality of stack molds. A stack mold support is disposed beneath the stack mold assembly and between the first and second platens. The stack mold has a clamping assembly for releasably engaging the stack mold assembly. The stack mold has a support frame to support the clamping assembly and the stack mold assembly between the first platen and the second platen.

The clamping assembly of the stack mold support is fixed to the support frame. The clamping assembly has a plurality of clamps fixed to a first member and a plurality of clamps fixed to a second member. The plurality of clamps are slideable along the first and second members to releasably engage the stack mold. The stack mold support is disposed below the stack mold in order to support the stack mold within the injection molding press. In an alternative embodiment of the present invention, the stack mold support is disposed above the stack mold in order to hang the stack mold within the injection molding press. In this embodiment, the support frame surrounds the tie-bars of the injection molding press.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
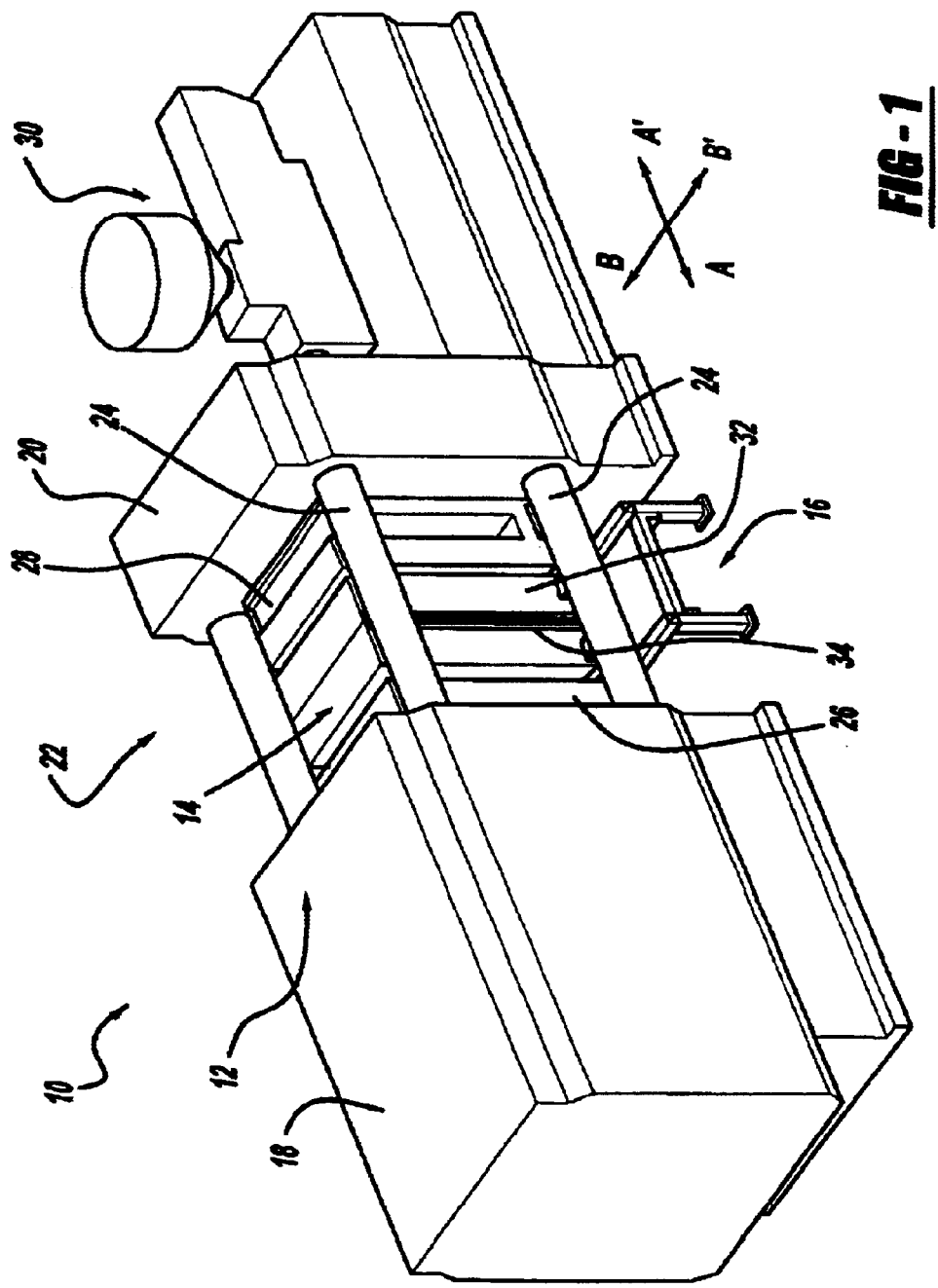
FIG. 1 is an isometric view of an injection molding system having a stack mold assembly and a stack mold support according to the principles of the present invention.

Referring now to FIG. 1, an injection molding system 10 is provided according to the principles of the present invention. The injection molding system 10 includes an injection molding press 12, a stack mold assembly 14 disposed within the injection molding press 12, and a stack mold support 16 disposed beneath the stack mold assembly 14 to support the stack mold assembly 14 within the injection molding press 12.

The injection molding press 12 has a first end 18 disposed opposite of a second end 20. The first end 18 and the second end 20 define a loading area 22 to receive the stack mold assembly 14. A plurality of tie-bars 24 extend from the first end 18 through the loading area 22 to the second end 20. A first platen 26 is fixed to the first end 18 within the loading area 22 and between the plurality of tie-bars 24 that face the second end 20. A second platen 28 is fixed to the second end 20 within the loading area 22 and between the plurality of tie-bars 24 that face the first end 18. An actuating mechanism 30, for example a motor driving a hydraulic cylinder, are disposed on the second end 20 to move the second platen 28 towards the first platen 26, thereby clamping the stack mold assembly 14.

The stack mold assembly 14 includes a plurality of stack molds 32 each having a mold cavity to receive an injected material under pressure. A spacer 34 is disposed between the plurality of stack molds 32 to provide support during clamping of the stack mold assembly 14 by the first platen 26 and the second platen 28.

Figure 2:
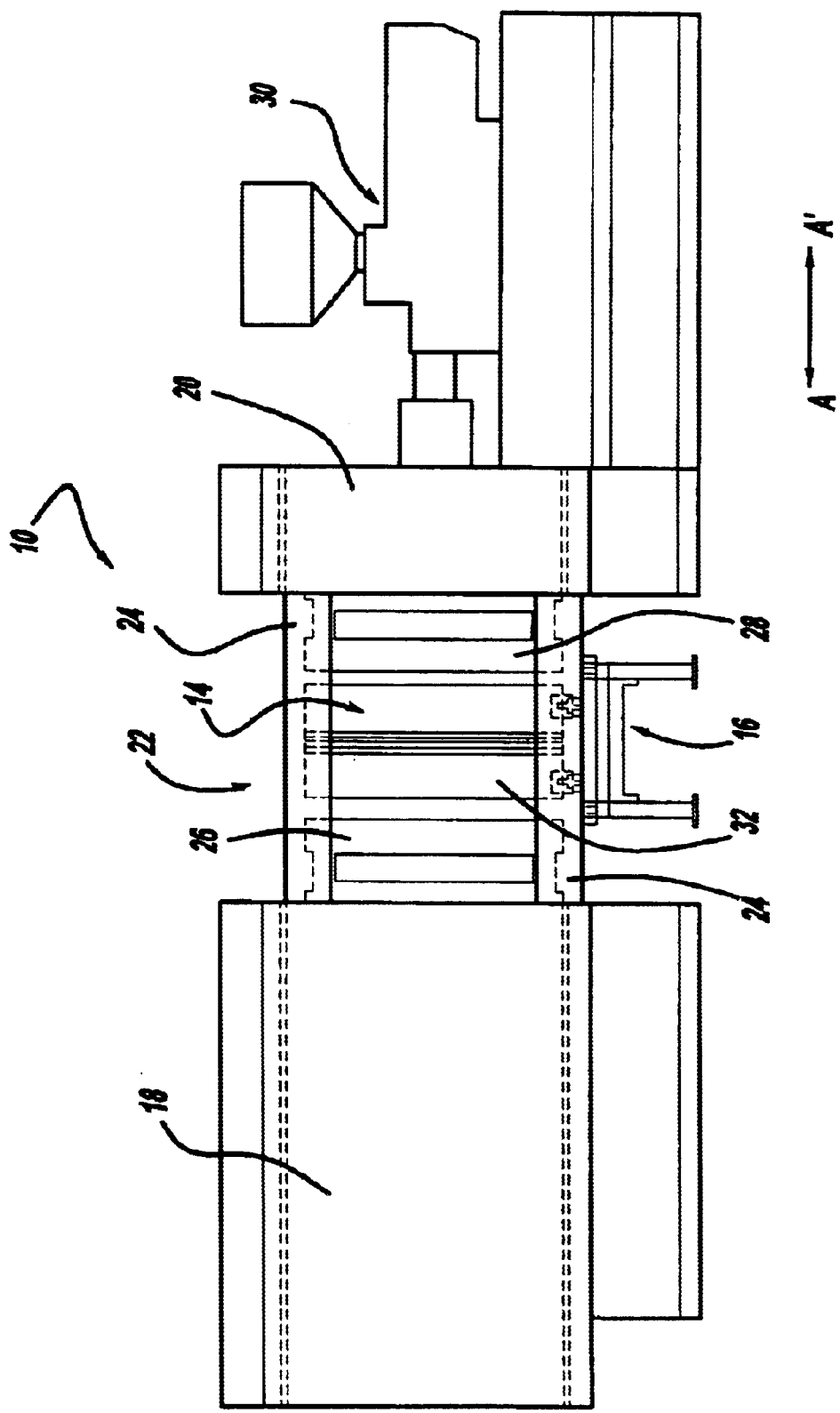
FIG. 2 is a side view of an injection molding system having a stack mold assembly and a stack mold support according to the principles of the present invention.
Figure 3:
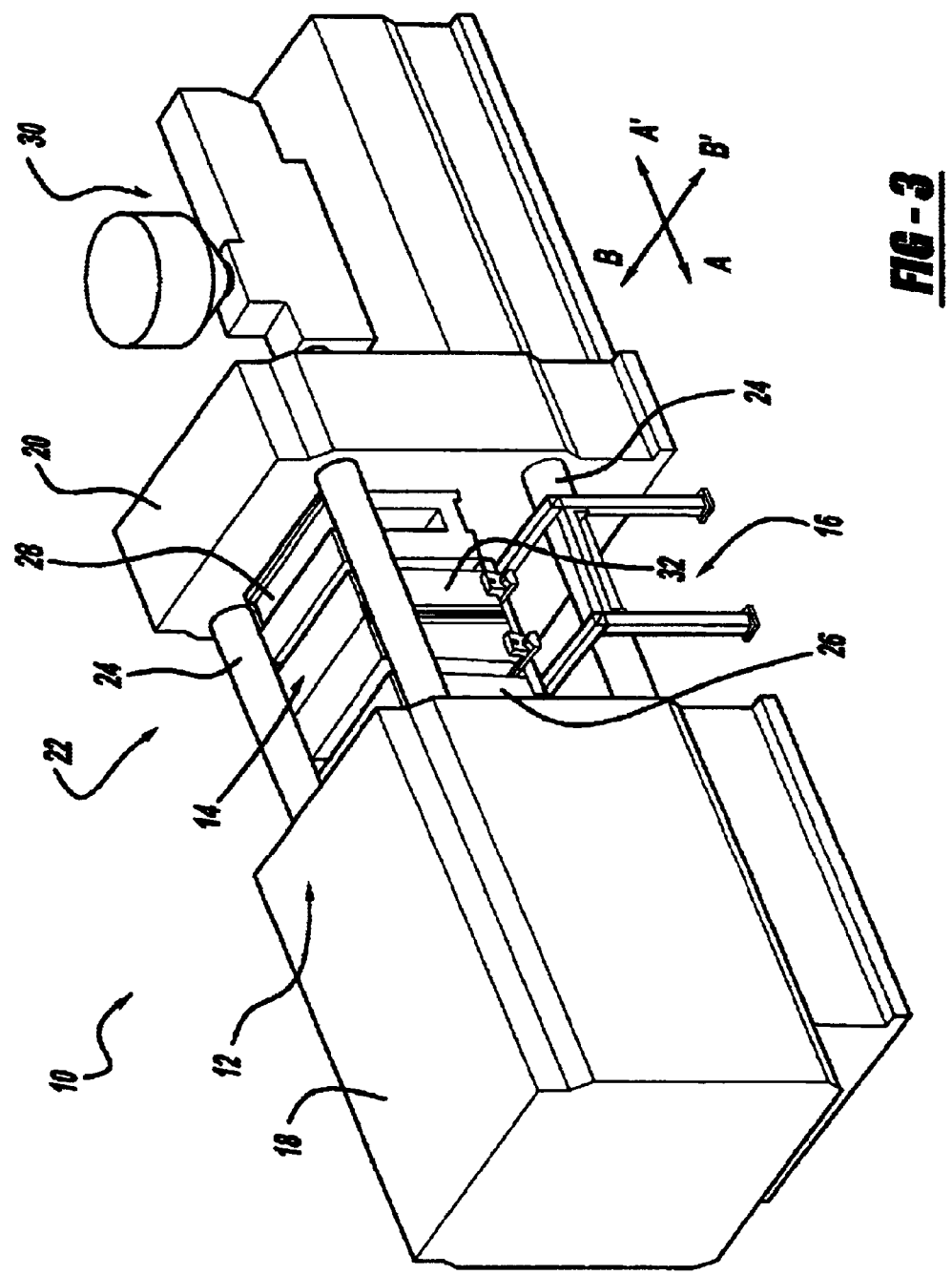
FIG. 3 is an isometric view of an alternative embodiment of an injection molding system having a stack mold assembly and a stack mold support according to the principles of the present invention.

As best seen in FIG. 2, the stack mold support 16 is disposed beneath the stack mold assembly 14 and beneath the plurality of tie-bars 24. The stack mold support 16 is releasably engagable with the stack mold assembly 14. The stack mold support 16 supports the stack mold assembly 14 within the loading area 22 and between the first platen 26 and the second platen 28. In an alternative embodiment of the present invention as seen in FIG. 3, the stack mold support 16 is disposed beneath the stack mold assembly 14 but above at least one of the plurality of tie-bars 24. The stack mold support 16 supports the stack mold assembly 14 within the loading area 22 and between the first platen 26 and the second platen 28.

Figure 4:
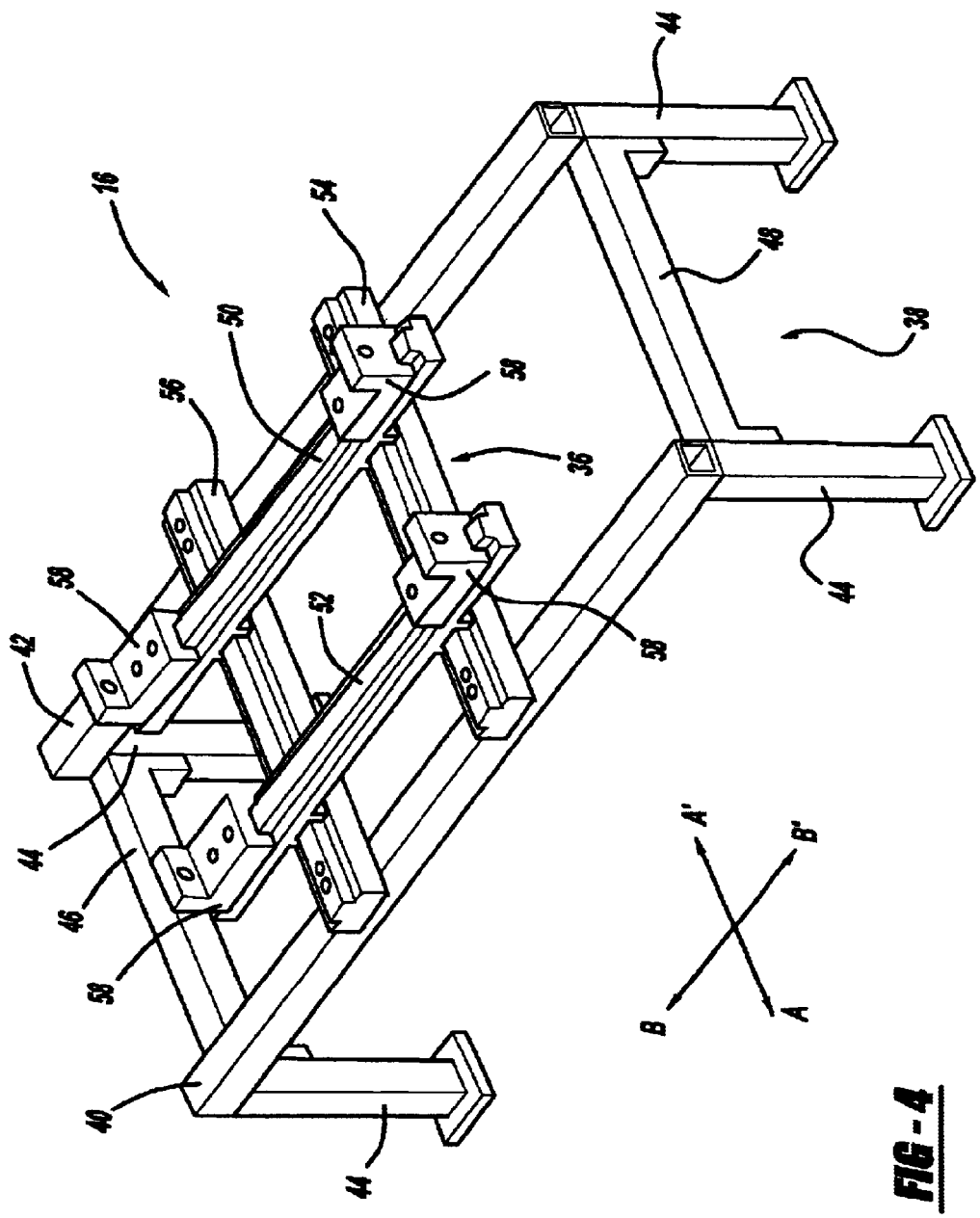
FIG. 4 is an isometric view of a stack mold support according to the principles of the present invention.

Referring now to FIG. 4, the stack mold support 16 includes a clamping assembly 36 and a support frame 38. The support frame 38 includes a first crossbeam 40 parallel to a second crossbeam 42. A plurality of support members 44 extend perpendicularly from the ends of the first crossbeam 40 and the second crossbeam 42. A first joiner 46 and a second joiner 48 each extend from the first crossbeam 40 to the second crossbeam 42. The first and second crossbeams 40, 42 and the first and second joiners 46, 48 are fixed to give the support frame 38 a generally rectangular shape.

The clamping assembly 36 includes a first member 50 parallel to a second member 52. The first member 50 and the second member 52 each extend from a third member 54 to a fourth member 56. The third member 54 and the fourth member 56 each extend from the first crossbeam 40 to the second crossbeam 42. The first member 50 and the second member 52 each are slideable along the third member 54 and the fourth member 56 in a first direction, indicated by arrows A–A'. Alternatively, the first member 50 and the second member 52 each move along the third member 54 and the fourth member 56 by rollers fixed to the first and second members 50, 52 or fixed to the third and fourth members 54, 56.

A plurality of clamps 58 are disposed on the first member 50 and the second member 52. The plurality of clamps 58 are slideable along the first and second members 50, 52 in a second direction, indicated by arrows B–B'. Alternatively, the plurality of clamps 58 are movable along the first and second members 50, 52 by rollers fixed to the first and second members 50, 52 or fixed to the plurality of clamps 58.

Referring generally to FIGS. 1–4, during operation of the injection molding system 10, the stack mold assembly 14 is positioned within the loading area 22 of the injection molding press 12 between the first and second platens 26, 28. The stack mold support 16 is positioned below the stack mold assembly 14 for support. The plurality of clamps 58 are moved in the second direction, arrows B–B', to adjustably receive the stack mold assembly 14. After positioning, the plurality of clamps 58 are releasably fixed to the stack mold assembly 14 by fasteners, such as bolts in the preferred embodiment. However, alternative methods of releasably fixing the stack mold assembly 14 to the plurality of clamps 58, such as screws, nails, press pins or the like, may also be used. Once the stack mold assembly 14 is in position within the loading area 22, the second platen 28 is moved in the first direction, arrows A–A', by the actuating mechanism 30. The stack mold assembly 14 also moves in the first direction, arrows A–A', by sliding along the third and fourth members 54, 56 of the stack mold support 16 until the stack mold assembly 14 is clamped between the first platen 26 and the second platen 28. In this way, the stack mold support 16 provides support to the stack mold assembly 14 while simultaneously enabling freedom of movement of the stack mold assembly 14 in the first direction, arrows A–A'. Once clamped, material may be injected into the plurality of stack molds 32, and then the stack mold assembly 14 released.

Figure 5:
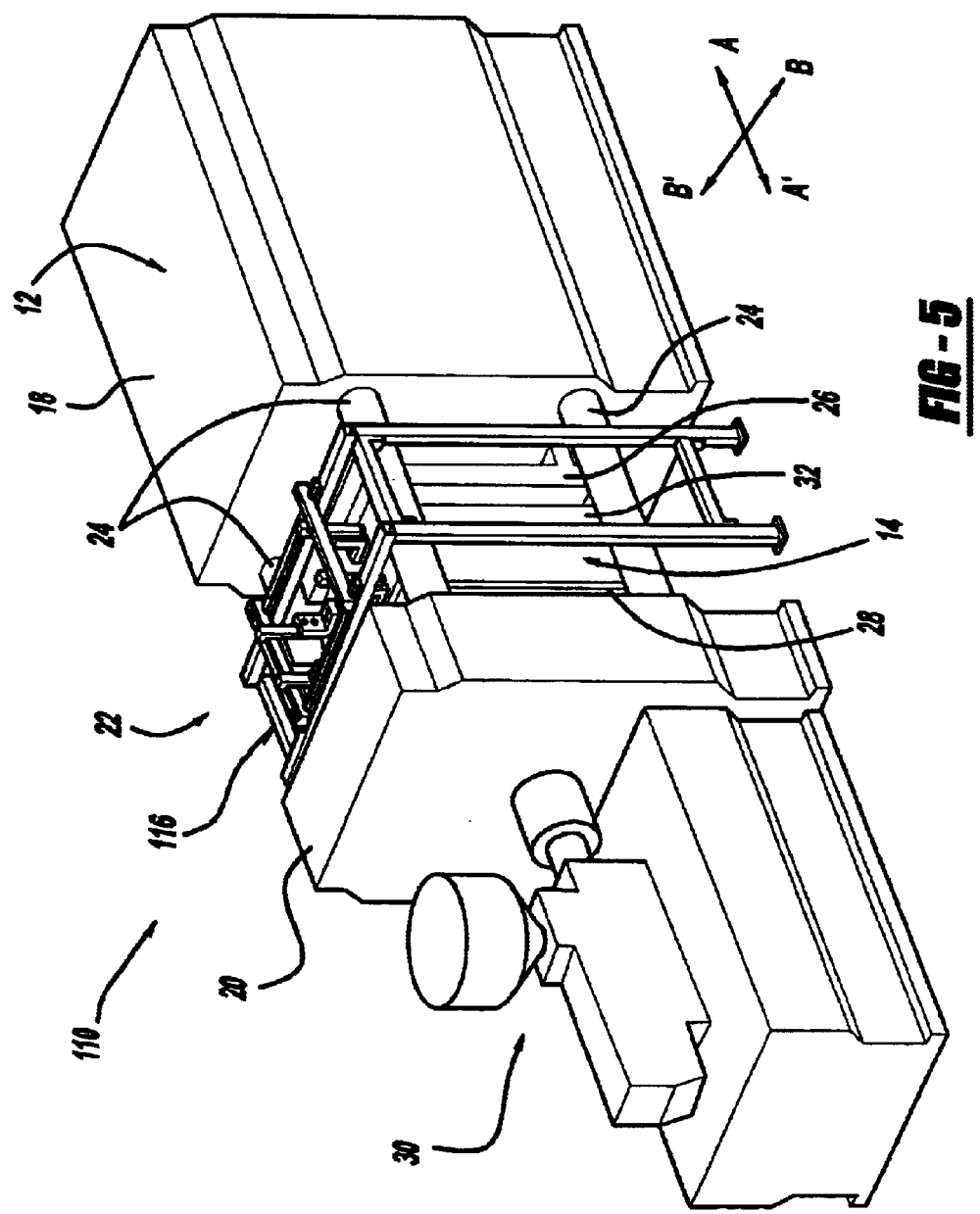
FIG. 5 is an isometric view of an alternative embodiment of an injection molding system having a stack mold assembly and an alternative stack mold support according to the principles of the present invention.

Referring now to FIG. 5, an alternative injection molding system 110 is provided. The injection molding system 110 includes the injection molding press 12, the stack mold assembly 14, and an alternative stack mold support 116. The stack mold support 116 is disposed within the loading area 22 and above the stack mold assembly 14. The stack mold support 116 hangs the stack mold assembly 14 within the loading area 22 between the first platen 26 and the second platen 28.

Figure 6:
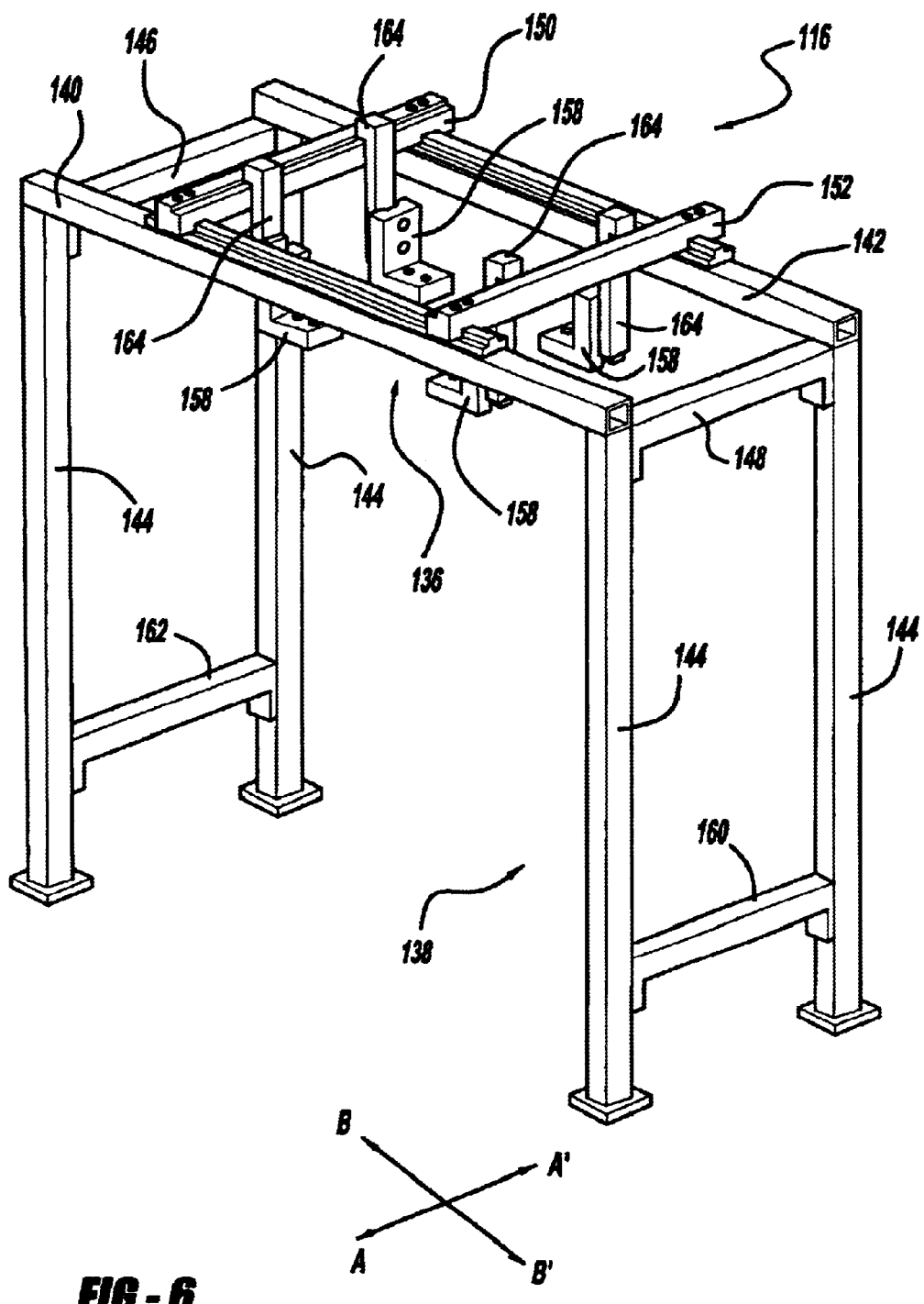
FIG. 6 is an isometric view of an alternative stack mold support according to the principles of the present invention.

Referring now to FIG. 6, the stack mold support 116 includes a clamping assembly 136 and a support frame 138. The support frame 138 includes a first crossbeam 140 parallel to a second crossbeam 142. A plurality of extended support members 144 extend perpendicularly from the ends of the first crossbeam 140 and the second crossbeam 142. A first joiner 146 and a second joiner 148 each extend from the first crossbeam 40 to the second crossbeam 42. A third joiner 160 and a fourth joiner 162 each extend from one of the plurality of extended support members 144 to another of the plurality of extended support members 144. The first and second crossbeams 140, 142 and the first and second joiners 146, 148 are fixed to give the support frame 138 a generally rectangular shape.

The clamping assembly 136 includes a first member 150 parallel to a second member 152. The first member 150 and the second member 152 each extend from the first crossbeam 140 to the second crossbeam 142. The first member 150 and the second member 152 each are slideable along the first crossbeam 140 and the second crossbeam 142 in the second direction, indicated by arrows B–B'. Alternatively, the first member 150 and the second member 152 each move along the first crossbeam 140 and the second crossbeam 142 by rollers fixed to the first and second members 150, 152 or fixed to the first and second crossbeams 140, 142.

A plurality of clamps 158 are disposed on a plurality of extenders 164 that extend from the first member 150 and the second member 152. The plurality of clamps 158 extend between the support frame 138. The plurality of extenders 164 are slideable along the first and second members 150, 152 in the first direction, indicated by arrows A–A'. Alternatively, the plurality of extenders 164 are movable along the first and second members 150, 152 by rollers fixed to the first and second members 150, 152 or fixed to the plurality of extenders 164.

Referring generally to FIGS. 5–6, during operation of the injection molding system 110, the stack mold assembly 14 is positioned within the loading area 22 of the injection molding press 12 between the first and second platens 26, 28. The stack mold support 116 is positioned above the stack mold assembly 14 for support. The plurality of clamps 158 are moved in the second direction, arrows B–B', to adjustably receive the stack mold assembly 14. After positioning, the plurality of clamps 158 are releasably fixed to the stack mold assembly 14 by fasteners, such as bolts in the preferred embodiment. However, alternative methods of releasably fixing the stack mold assembly 14 to the plurality of clamps 158, such as screws, nails, push pins or the like, may also be used. Once the stack mold assembly 14 is in position within the loading area 22, the second platen 28 is moved in the first direction, arrows A–A', by the actuating mechanism 30. The stack mold assembly 14 also moves in the first direction, arrows A–A', by sliding along the first and second members 150, 152 of the stack mold support 116 until the stack mold assembly 14 is clamped between the first platen 26 and the second platen 28. In this way, the stack mold support 116 provides support to the stack mold assembly 14 while simultaneously enabling freedom of movement of the stack mold assembly 14 in the first direction, arrows A–A'. Once clamped, material may be injected into the plurality of stack molds 32, and then the stack mold assembly 14 released.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stack mold support for use with a stack mold in an injection molding press comprising:
   a support frame;
   a clamping assembly fixed to said support frame, said clamping assembly having a plurality of clamps being adjustable to releasably engage a stack mold and said clamping assembly enabling sliding movement of said plurality of clamps in at least one direction.

2. The stack mold support of claim 1, wherein said clamping assembly includes a first member fixed to said support frame and a second member fixed to said support frame, said plurality of clamps fixed to said first member and said second member.

3. The stack mold support of claim 2, wherein said support frame includes a first crossbeam member parallel to a second crossbeam member and a first joiner member parallel to a second joiner member, said first joiner member fixed to said first crossbeam member and said second crossbeam member, and said second joiner member fixed to said first crossbeam member and said second crossbeam member to form a generally rectangular shape, said support frame having four support members, each one of said four support members fixed to said first crossbeam member and fixed to said second crossbeam member such that said support members are perpendicular to said first and second crossbeam members and said first and second joiner members.

4. The stack mold support of claim 3, wherein said clamping assembly further includes a third member parallel to a fourth member, said third member fixed to said frame and extending from said first crossbeam member to said second crossbeam member, said fourth member fixed to said frame and extending from said first crossbeam member to said second crossbeam member.

5. The stack mold support of claim 4, wherein said first member of said clamping assembly extends from said third member to said fourth member and is slideable along said third member and said fourth member in a first direction, and said second member extends from said third member to said fourth member parallel to said first member and is slideable along said third member and said fourth member in said first direction.

6. The stack mold support of claim 5, wherein said plurality of clamps are slideable along said first member and said second member in a second direction for releasably engaging said stack mold.

7. The stack mold support of claim 3, wherein said first member of said clamping assembly extends from said first crossbeam member to said second crossbeam member and is slideable along said first crossbeam member and said second crossbeam member, and said second member extends from said first crossbeam member to said second crossbeam member and is slideable along said first crossbeam member and said second crossbeam member.

8. The stack mold support of claim 7, wherein said plurality of clamps extend below said support frame on a plurality of extenders for releasably engaging said stack mold, said plurality of extenders slideable along said first member and said second member.

9. An injection molding system comprising: an injection molding press having a first end connected by a plurality of tie-bars to a second end, said first end having a first platen disposed between said plurality of tie-bars and facing said second end, said second end having a second platen disposed between said plurality of tie-bars and facing said first end; a stack mold assembly disposed between said first platen and said second platen, said stack mold assembly having a plurality of stack molds; and a self-supporting stack mold support disposed adjacent said stack mold assembly and between said first and second platens, said stack mold support having a clamping assembly for releasably engaging said stack mold assembly and having a support frame for supporting said clamping assembly and said stack mold assembly between said first platen and said second platen.

10. The injection molding system of claim 9, wherein said self-supporting stack mold support is disposed beneath said stack mold assembly.

11. The injection molding of claim 10, wherein said support frame of said self-supporting stack mold support extends above and around at least one of said plurality of tie-bars.

12. The injection molding system of claim 10, wherein said clamping assembly of said stack mold support includes a first member and a second member, said first and second members slideable in a first direction parallel to said tie-bars when said stack mold assembly is clamped between said first and second platens.

13. The injection molding system of claim 12, wherein said first member has a first clamp and a second clamp slideable along said first member in a second direction for adjustably engaging said plurality of stack molds, and said second member has a third clamp and a fourth clamp slideable along said second member in said second direction for adjustably engaging said plurality of stack molds.

14. The injection molding system of claim 13, wherein said first clamp, said second clamp, said third clamp, and said fourth clamp slide along rails.

15. The injection molding system of claim 13, wherein said first clamp, said second clamp, said third clamp, and said fourth clamp move along rollers.

16. The injection molding system of claim 12, wherein said first member and said second member slide along a third member fixed to said support frame and slide along a fourth member fixed to said support frame.

17. The injection molding system of claim 12, wherein said first member and said second member move along a third member fixed to said support frame and move along a fourth member fixed to said support frame.

18. The injection molding system of claim 9, wherein said self-supporting stack mold support is disposed above said stack mold assembly such that said support frame extends above and around said plurality of tie-bars and said clamping assembly hangs said stack mold assembly between said first and second platens.

19. The injection molding system of claim 18, wherein said clamping assembly of said stack mold support includes a first member and a second member, said first and second members slideable in a second direction perpendicular to said plurality of tie-bars for releaseably engaging said stack mold assembly.

20. The injection molding system of claim 19, wherein said first and second members have a plurality of extenders each having a clamp for releaseably engaging said stack mold assembly, said plurality of extenders slideable along said first and second members in a first direction parallel to said plurality of tie-bars such that said stack mold assembly moves with said clamping assembly in said first direction.

21. A stack mold support for use with a stack mold in an injection molding press comprising:
   a stack mold;
   a support frame;
   a clamping assembly fixed to said support frame, said clamping assembly having a plurality of clamps being adjustable to releasably engage said stack mold.

* * * * *